(12) United States Patent
Davis et al.

(10) Patent No.: US 7,077,884 B2
(45) Date of Patent: *Jul. 18, 2006

(54) HYDROGEN SULFIDE SCRUBBER USING POLYMERIC AMINE AND ASSOCIATED METHODS

(75) Inventors: Jerry M. Davis, Okahumpka, FL (US); James E. Cheshire, Tavares, FL (US)

(73) Assignee: Precision Control Technology, Inc., Tavares, FL (US)

( * ) Notice: Subject to any disclaimer, the term of this patent is extended or adjusted under 35 U.S.C. 154(b) by 80 days.

This patent is subject to a terminal disclaimer.

(21) Appl. No.: 10/864,310

(22) Filed: Jun. 9, 2004

(65) Prior Publication Data

US 2005/0274256 A1    Dec. 15, 2005

(51) Int. Cl.
*B01D 53/14* (2006.01)
(52) U.S. Cl. ............... 95/8; 95/199; 95/223; 95/235; 96/235; 96/244; 423/228
(58) Field of Classification Search ............... 95/187, 95/199, 211, 223, 224, 235, 8; 96/235, 244, 96/290; 423/220, 226, 228
See application file for complete search history.

(56) References Cited

U.S. PATENT DOCUMENTS

| | | | | |
|---|---|---|---|---|
| 2,805,734 | A * | 9/1957 | Riess et al. ............... 95/199 |
| 3,387,431 | A | 6/1968 | Siebert ............... 55/51 |
| 3,780,499 | A * | 12/1973 | Dorr et al. ............... 95/211 |
| 4,029,751 | A * | 6/1977 | Dorr et al. ............... 423/522 |
| 4,508,545 | A | 4/1985 | DeLoach ............... 55/53 |
| 5,061,373 | A | 10/1991 | Gallup ............... 210/697 |
| 5,128,049 | A | 7/1992 | Gatlin ............... 210/752 |
| 5,135,684 | A | 8/1992 | Mohn et al. ............... 261/76 |
| 5,288,728 | A | 2/1994 | Spears et al. ............... 210/729 |
| 5,314,672 | A | 5/1994 | Vasil ............... 423/228 |
| 5,347,003 | A | 9/1994 | Trauffer et al. ............... 544/8 |
| 5,354,459 | A | 10/1994 | Smith ............... 210/188 |
| 5,356,458 | A | 10/1994 | Javadi et al. ............... 95/13 |
| 5,405,591 | A | 4/1995 | Galloway ............... 423/228 |
| 5,462,721 | A | 10/1995 | Pounds et al. ............... 423/226 |
| 5,478,536 | A | 12/1995 | Galloway ............... 422/234 |
| 5,480,860 | A | 1/1996 | Dillon ............... 423/228 |
| 5,488,103 | A | 1/1996 | Gatlin ............... 536/55.2 |

(Continued)

OTHER PUBLICATIONS

2001 Annual Drinking Water Report, Utilities Water Division, Orange County Government, Florida.

(Continued)

*Primary Examiner*—Frank M. Lawrence
(74) *Attorney, Agent, or Firm*—Allen, Dyer, Doppelt, Milbrath & Gilchrist, P.A.

(57) ABSTRACT

A hydrogen sulfide scrubber includes first and second scrubber tanks with scrubber media contained therein. Scrubbing solution circulators each include a dispenser for dispensing scrubbing solution into contact with the scrubber media, a sump for collecting the scrubbing solution after contact with the scrubber media, and a circulating pump for circulating the scrubbing solution from the sump back to the dispenser after contact with the scrubber media. A polymeric amine supply is provided for supplying a polymeric amine to the scrubbing solution in the second tank. The scrubbing solution in the first tank may be charged with the polymeric amine by a charging line extending from the second tank to the first tank. In other embodiments, a regenerative blower and associated nozzle may be used to generate a scrubbing solution mist in the space beneath the scrubber media and above the sump.

47 Claims, 8 Drawing Sheets

U.S. PATENT DOCUMENTS

| | | | | |
|---|---|---|---|---|
| 5,507,848 A | * | 4/1996 | Beckman | 55/522 |
| 5,549,820 A | | 8/1996 | Bober et al. | 210/199 |
| 5,554,349 A | | 9/1996 | Rivers et al. | 423/228 |
| 5,667,558 A | | 9/1997 | Bryan et al. | 95/8 |
| 5,667,651 A | | 9/1997 | Bryan | 204/401 |
| 5,688,478 A | | 11/1997 | Pounds et al. | 423/228 |
| 5,698,171 A | | 12/1997 | Trauffer et al. | 423/220 |
| 5,756,058 A | * | 5/1998 | Watanabe et al. | 423/238 |
| 5,863,128 A | | 1/1999 | Mazzei | 366/163.2 |
| 5,885,538 A | | 3/1999 | Trauffer et al. | 423/220 |
| 6,063,346 A | | 5/2000 | Luna | 423/220 |
| 6,142,383 A | | 11/2000 | Planker | 239/8 |
| 6,551,382 B1 | * | 4/2003 | Richards | 95/66 |
| 6,773,582 B1 | * | 8/2004 | Anthony | 210/188 |
| 2004/0055463 A1 | | 3/2004 | Anthony | 95/8 |

OTHER PUBLICATIONS

Industrial Air Solutions, 2001, Gas Wet Scrubber Tower Packing Media, available at www.industrialairsolutions.com/wet-scrubbers/tripac.htm.

$Q^2$ Technologies, 2001, ENVIRO-SCRUB® Process, available at www.q2technologies.com/escrub.htm.

$Q^2$ Technologies, 2001, Enviro-Tek™ Process, available at www.q2technologies.com/etek.htm.

Champion Technologies, $H_2S$ Scavenging Technology, available at www.champ-tech.com/h2scavenging.asp.

Quaker Chemical Corporation, 2000, Worldwide Innovations, available at www.quakerchem.com/products/product_desc.htm.

Quaker Chemical Corporation, 2000, Customer Processes & Applications, available at www.quakerchem.com/products/by_app.htm.

Gary J. Nagl, Article entitled "Controlling $H_2S$ Emissions in Geothermal Power Plants", available at www.gtp-merichem.com/whats_geo_euro.htm.

Met-Pro Corporation, 2000, Duall Division Various Fume and Gas Wet Scrubbers, available at www.met-pro.com/html/duall.htm.

Sulfa-Clear 8640 Hydrogen Sulfide Scavenger, Technical Data, Clearwater, Jun. 2003.

Sulfa-Clear, Safely and Effectively Removes $H_2S$, Weatherford, 2004.

\* cited by examiner

HYDROGEN SULFIDE SCRUBBER USING POLYMERIC AMINE AND ASSOCIATED METHODS

FIELD OF THE INVENTION

The present invention relates to the field of drinking water treatment and, more particularly, to the field of hydrogen sulfide scrubbing in a drinking water treatment system.

BACKGROUND OF THE INVENTION

Drinking water is typically extracted from an aquifer and processed in a water treatment system to remove undesired contaminants and impurities, and add a sanitizer, such as chlorine, for example. Water taken from an aquifer may contain a high hydrogen sulfide content, because of surrounding geological features and/or the action of certain bacteria. Unfortunately, hydrogen sulfide gas has an unpleasant odor and it is undesirable to discharge into the atmosphere that can then annoy residents of surrounding neighborhoods, for example.

Some water treatment plants remove or scrub hydrogen sulfide from the water with a caustic scrubbing solution, such as including potassium hydroxide or sodium hydroxide. In such a system, water pumped from the aquifer is first passed through an aerator for extracting a hydrogen sulfide-containing gas flow from the water. The hydrogen sulfide-containing gas flow is then passed through a hydrogen sulfide scrubber including at least one scrubber tank through which the caustic scrubbing solution is circulated and constantly replenished.

A common configuration of a hydrogen sulfide scrubber includes two scrubber tanks each having generally lightweight scrubber media therein. The scrubber tanks may be as offered by the Duall Division of Met-Pro Corporation of Owosso, Mich. under the model series designation PT-500. The scrubber media may be in the form of hollow spheres with passageways therein to provide a large surface area to enhance the capture of hydrogen sulfide from the gas flow and into the scrubbing solution. The hydrogen sulfide scrubber may also include first and second scrubbing solution circulators, each dispensing a scrubbing solution into contact with the scrubber media, a sump for collecting the scrubbing solution, and a circulating pump for circulating the scrubbing solution from the sump and back to the dispenser. The scrubbing solution includes caustic to adjust the pH to a desired level at which the hydrogen sulfide will more readily dissolve into the scrubbing solution.

The caustic material, however, causes a build-up in the scrubber tank, and especially on the scrubber media. This build-up covers and may block the passageways in the scrubber media and reduce the available surface area for extracting the hydrogen sulfide. The build-up also increases the weight of the scrubber media and reduces movement during scrubbing. Moreover, the increased weight may also stress the supporting structure of the tank.

Periodic cleaning is recommended for caustic-based hydrogen sulfide scrubbers. Such cleaning is generally performed by acid washing and is relatively difficult. Accordingly, maintenance may be postponed until the removal of hydrogen sulfide is no longer acceptable. At this point, very costly replacement of the scrubber media may be needed. The use of caustic further requires careful handling, and is relatively expensive when the cost of removing the build-up is considered. The use of caustic also requires a considerable flow of make-up water and a corresponding relatively large discharge of spent scrubber solution into the sewer system.

A significant advance in the area of hydrogen sulfide removal, while reducing build-up in the scrubber, is the use of triazine compound in the scrubber solution as disclosed in published U.S. patent application Ser. No. 2004/0055463 assigned to the present assignee. Despite the improvement offered by the use of the triazine compound versus traditional caustic scrubbing solutions, other odor causing compounds may still be released, such as volatile mercaptans. The mercaptans may cause an undesirable odor in the vicinity of the scrubber. Of course, there is also a continuing desire to increase hydrogen sulfide removal and reduce build-up on the scrubbing media.

SUMMARY OF THE INVENTION

In view of the foregoing background, it is therefore an object of the present invention to provide a cost effective and relatively straightforward process to treat hydrogen sulfide in a drinking water system while reducing build-up and the need for maintenance, and also while reducing the release of volatile mercaptans.

These and other objects, features and advantages in accordance with the invention are provided by a hydrogen sulfide scrubber comprising first and second scrubber tanks, a polymeric amine supply connected to a second scrubbing solution circulator for the second scrubber tank, and a scrubbing solution charging line for supplying a portion of a second scrubbing solution to a first scrubbing solution in the first scrubber tank to charge the first scrubbing solution with the polymeric amine. The hydrogen sulfide scrubber may be used for drinking water treatment or wastewater treatment, for example. The use of the polymeric amine reduces volatile mercaptans to thereby reduce undesired odors. In addition, the charging line provides efficient and cost effective use of the polymeric amine. The polymeric amine also effectively reduces the hydrogen sulfide content without causing extensive build-up within the tank and on the media.

The first scrubber tank may contain first scrubber media therein, and may have a gas flow inlet to receive a hydrogen sulfide-containing gas flow and a gas flow outlet. The second scrubber tank may contain a second scrubber media therein, and may have a gas flow inlet connected downstream from the gas flow outlet of the first scrubber tank. The scrubber may include a first scrubbing solution circulator that includes a first dispenser for dispensing the first scrubbing solution into contact with the first scrubber media, a first sump for collecting the first scrubbing solution after contact with the first scrubber media, and a first circulating pump for circulating the first scrubbing solution from the first sump back to the first dispenser after contact with the first scrubber media. Similarly, the scrubber may also include a second scrubbing solution circulator comprising a second dispenser for dispensing a second scrubbing solution into contact with the second scrubber media, a second sump for collecting the second scrubbing solution after contact with the second scrubber media, and a second circulating pump for circulating the second scrubbing solution from the second sump back to the second dispenser after contact with the second scrubber media. In other words, the scrubber may be at least a two-stage scrubber.

The scrubber may also include a controller for controlling the polymeric amine supply based upon hydrogen sulfide sensors associated with the first and second scrubber tanks. In particular, the hydrogen sulfide sensors may comprise an inlet gas sensor that includes a sampling tube having an inlet connected in fluid communication with the hydrogen sulfide-containing gas flow to the first scrubber tank. The hydrogen sulfide sensor may also include a hydrogen sulfide sensing device connected to the outlet of the sampling tube. A purge pump may be connected to the sampling tube adjacent the outlet thereof. A condensation drain valve may also be connected to the sampling tube to drain accumulated condensation from within the sampling tube. The controller may periodically operate the purge pump and the condensation drain valve to enhance the accuracy of the readings.

The sensor, purge pump, and drain valve may be positioned within a housing of the controller. A similar outlet gas sensor may also be provided which includes a sampling tube having an inlet connected in fluid communication with a discharge gas flow from the second scrubber tank, for example.

The scrubber may further comprise a make-up water supply connected to at least one of the first and second scrubbing solution circulators. In some embodiments, the hydrogen sulfide scrubber may further comprise a caustic supply and a switchover valve arrangement for permitting selective alternate operation using the caustic supply or the polymeric amine supply. This permits a scrubber to be operated using either scrubbing solution chemistry.

The hydrogen sulfide scrubber may further include a regenerative blower and an associated nozzle for generating a scrubbing solution mist in at least one of the first and second scrubber tanks. The scrubbing solution mist comprising the polymeric amine may be especially helpful in removing a significant portion of the hydrogen sulfide and any volatile mercaptans, for example. The first scrubber tank may have a first space above the first sump and beneath the first scrubber media, and the regenerative blower and nozzle may generate the scrubbing solution mist in the first space. The nozzle may be a venturi injector nozzle, for example. This regenerative blower and nozzle to generate a mist of the scrubbing solution may be used in the multi-stage scrubber, or even a single stage scrubber that does not include the charging line as discussed above.

A method aspect in accordance with the invention is for hydrogen sulfide scrubbing. The method may include using a first scrubber tank and first scrubber media contained therein by operating a first scrubbing solution circulator comprising a first dispenser dispensing a first scrubbing solution into contact with the first scrubber media, a first sump collecting the first scrubbing solution after contact with the first scrubber media, and a first circulating pump circulating the first scrubbing solution from the first sump back to the first dispenser after contact with the first scrubber media. The method may also include using a second scrubber tank and second scrubber media contained therein downstream from the first scrubber tank by operating a second scrubbing solution circulator comprising a second dispenser dispensing a second scrubbing solution into contact with the second scrubber media, a second sump collecting the second scrubbing solution after contact with the second scrubber media, and a second circulating pump circulating the second scrubbing solution from the second sump back to the second dispenser after contact with the second scrubber media. Moreover, the method may include supplying a polymeric amine to the second scrubbing solution circulator, and supplying a portion of the second scrubbing solution to the first scrubbing solution via a charging line to charge the first scrubbing solution with the polymeric amine.

Another method aspect of the invention is also for hydrogen sulfide scrubbing. This method may include using a scrubber tank and scrubber media contained therein by operating a scrubbing solution circulator comprising a dispenser dispensing a scrubbing solution into contact with the scrubber media, a sump collecting the scrubbing solution after contact with the scrubber media, and a circulating pump circulating the scrubbing solution from the sump back to the dispenser after contact with the scrubber media. Moreover, the method may also include supplying a polymeric amine to the scrubbing solution circulator, and generating a scrubbing solution mist in the scrubber tank. The scrubbing solution mist may be generated using a regenerative blower and associated nozzle.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notation are used to indicate similar elements in alternate embodiments Referring initially to FIGS. 1 and 2, a drinking water treatment system 10 is now described. The drinking water treatment system 10 illustratively includes a pump 15 for pumping water from an aquifer 17 that is below ground level. For example, the aquifer 17 may be between 100 and 1000 feet below ground level.

Figure 1:
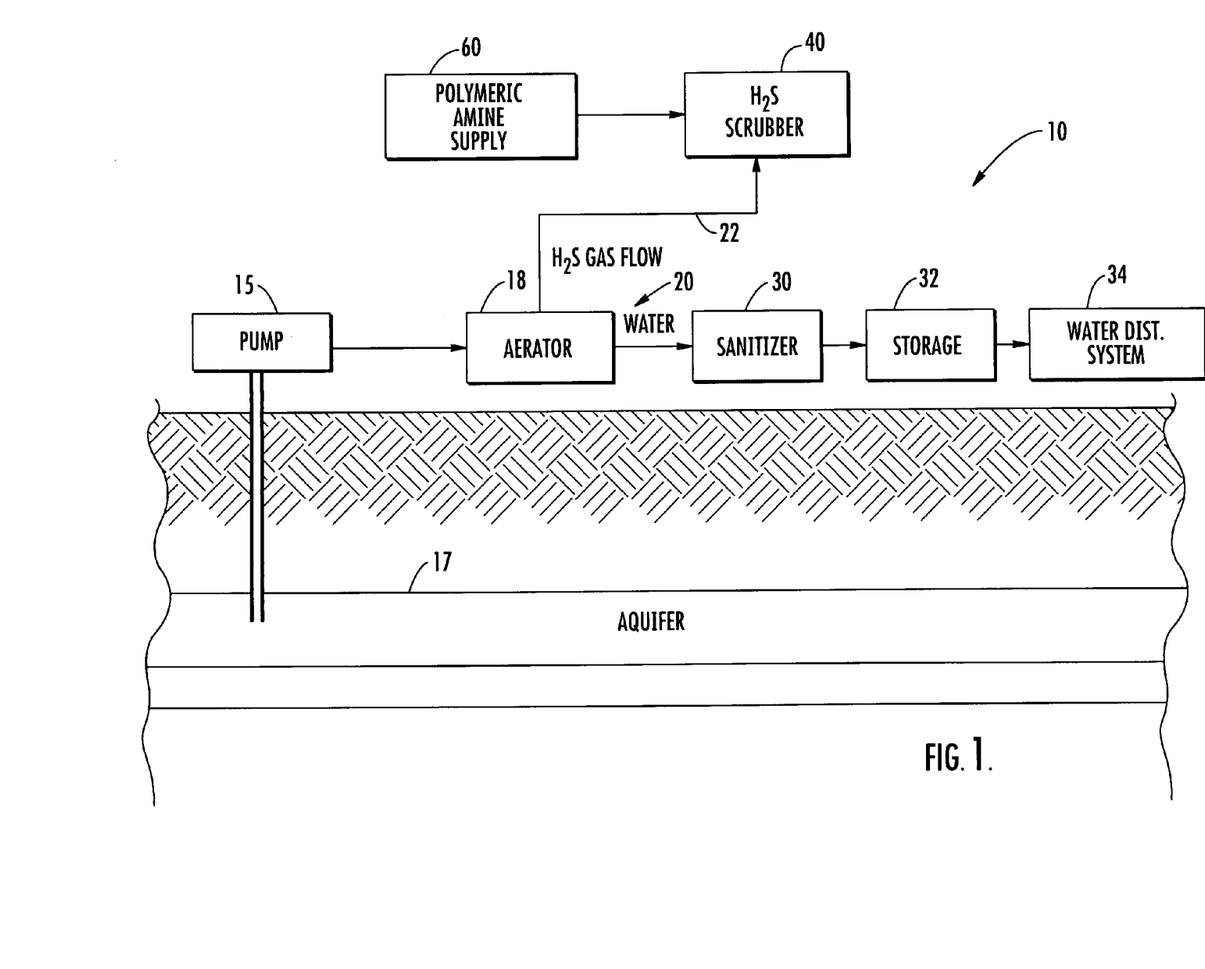
FIG. 1 is a schematic diagram of a water treatment system including an embodiment of the hydrogen sulfide scrubber according to the present invention.

The drinking water treatment system 10 also illustratively comprises an aerator 18 downstream from the pump 15 for generating an outlet water flow 20 and a hydrogen sulfide-containing gas flow 22 by extracting hydrogen sulfide from the water. A sanitizer 30 for sanitizing the outlet water flow 20 is connected downstream from the aerator 18 to make drinking water. The sanitizer 30 may, for example, be provided by a chlorinator, ultra-violet light exposure, or other sanitizing processes as understood by those skilled in the art. Depending on the needs of the community, the drinking water treatment system 10 may include a storage facility 32 for storing the sanitized water before it is dispensed to the community through a water distribution system 34. Of course, the drinking water treatment system 10 may include processing stages that have been omitted for clarity as needed to treat water in different communities, e.g., fluorination and filtration, as understood by those skilled in the art.

Figure 2:
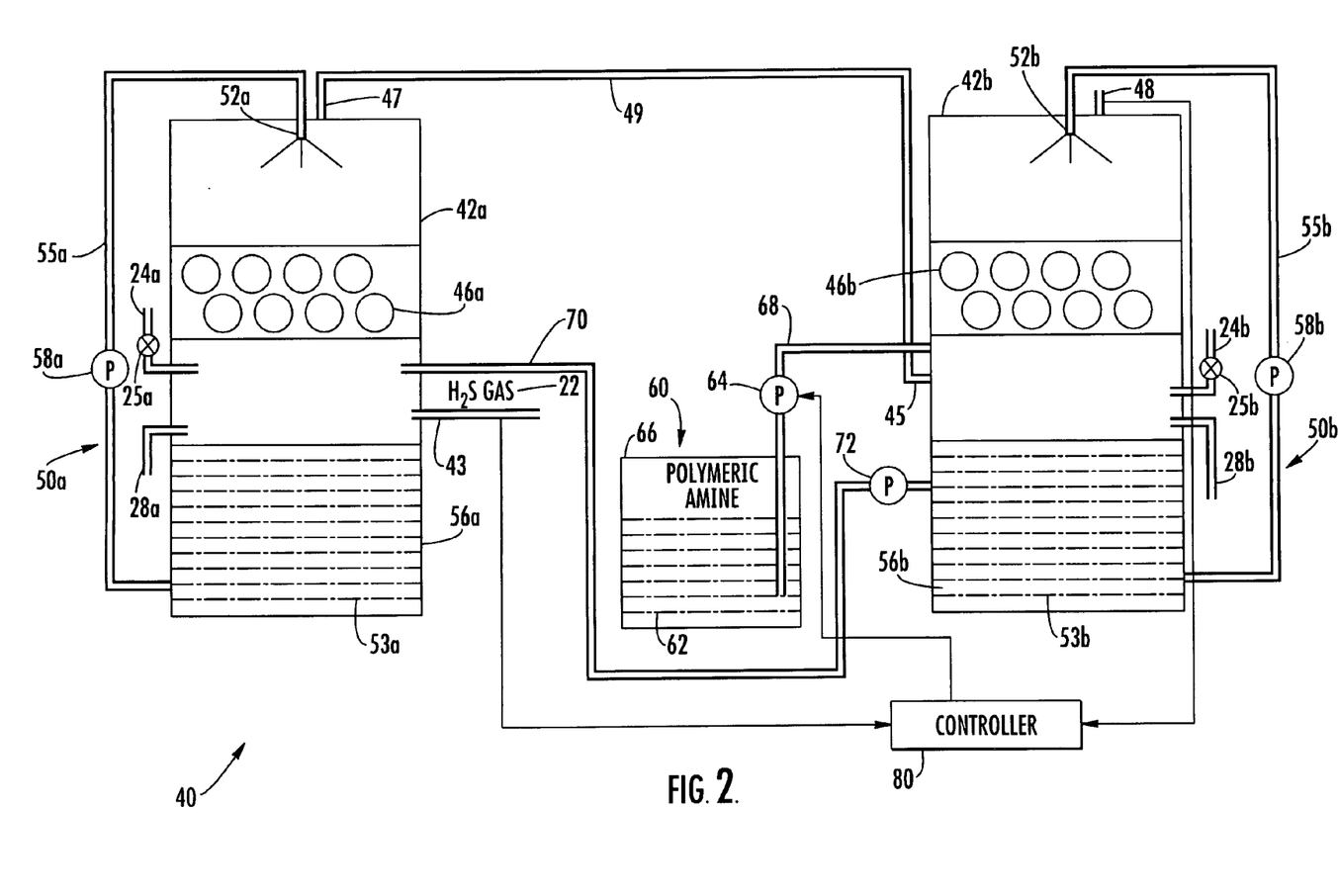
FIG. 2 is a more detailed schematic diagram of the hydrogen sulfide scrubber and controller as shown in FIG. 1.

The drinking water treatment system 10 further illustratively comprises a hydrogen sulfide scrubber 40 for scrubbing the hydrogen sulfide-containing gas flow 22 from the aerator 18. Referring more particularly to FIG. 2, the hydrogen sulfide scrubber 40 includes a first scrubber tank 42a and a second scrubber tank 42b.

The first scrubber tank 42a illustratively includes a gas flow inlet 43 connected to the aerator 18 to receive the hydrogen sulfide-containing gas flow 22 therefrom. A gas flow outlet 47 is illustratively included at an upper portion of the first scrubber tank 42a. The second scrubber tank 42b illustratively includes a gas flow inlet 45 connected to the gas flow outlet 47 of the first scrubber tank 42a via a gas flow line 49. The second scrubber tank 42b further includes a gas flow outlet 48 at an upper portion thereof from which the treated gas flow is discharged to the atmosphere.

Scrubber media 46a, 46b are illustratively contained within the first and second scrubber tanks 42a, 42b. The scrubber media 46a, 46b may, for example, be provided by generally lightweight and hollow spheres made of polypropylene material. Such spheres are available from Tri-Pac of Raleigh, N.C. under the trade name Tri-Packs®. Other scrubbing media is also contemplated by the present invention.

The hydrogen sulfide scrubber 40 further illustratively comprises first and second scrubbing solution circulators 50a, 50b connected to each of the first and second scrubber tanks 42a, 42b. The first scrubbing solution circulator 50a uses a first scrubbing solution 53a and the second scrubbing solution circulator 50b uses a second scrubbing solution 53b.

The scrubbing solution circulators 50a, 50b include dispensers 52a, 52b for dispensing the first and second scrubbing solutions 53a, 53b into contact with the scrubber media 46a, 46b. The scrubbing solution circulators 50a, 50b also include sumps 56a, 56b for collecting the first and second scrubbing solutions 53a, 53b after contact with the scrubber media 46a, 46b, and circulating pumps 58a, 58b for circulating the first and second scrubbing solutions from the sumps back to the dispensers 52a, 52b after contact with the scrubber media. The scrubbing solution circulators 50a, 50b include circulator lines 55a, 55b connected between the sump 56a, 56b and the dispensers 52a, 52b. The circulating pumps 58a, 58b may be connected to the circulator lines 55a, 55b to circulate the first and second scrubbing solutions 53a, 53b from the sumps 56a, 56b to the dispensers 52a, 52b.

The drinking water treatment system 10 is but one example of the use of the hydrogen sulfide scrubber 40 in accordance with the present invention. For example, the hydrogen sulfide scrubber 40 could also be used for treating hydrogen sulfide-containing gas from wastewater. Other applications of the hydrogen sulfide scrubber 40 will be readily understood by those skilled in the art.

The hydrogen sulfide scrubber 40 further illustratively comprises a polymeric amine compound supply 60 for supplying a polymeric amine reagent 62 to the second scrubbing solution 53b. The polymeric amine 62 captures the hydrogen sulfide into the scrubber solution 53a, 53b, as well as mercaptans.

For example, Weatherford of Houston, Tex. offers a line of chemicals under the designation SULFA-CLEAR® to remove nuisance hydrogen sulfide from natural gas, crude oil, LPG, NGL, waster water, ground water, and aqueous systems. SULFA-CLEAR® is formulated for absorption hydrogen sulfide and volatile mercaptans. The combination of multiple amine sites and organophilic properties allows for fast, efficient abatement of these problem compounds. SULFA-CLEAR® absorbs and reacts with the hydrogen sulfide and mercaptans to form water-soluble and non-volatile poly sulfides that are readily consumed in the downstream waste treatment process. The spent reaction products may also help reduce corrosion. The chemical composition and properties of SULFA-CLEAR® are further described in U.S. Pat. No. 5,488,103, the entire contents of which are incorporated herein by reference. Applicants have also found that the particular polymeric amine reagent identified as SULFA-CLEAR® 5167 may be especially useful, although other similar products are also contemplated by the present invention.

In its associated marketing literature, Weatherford discloses that maximization of contact is the important physical component for efficient removal of hydrogen sulfide. The chemical reagent should partition to where the hydrogen sulfide resides in the gas, hydrocarbon liquid, or water. Liquid scavengers are identified as the most effective and versatile reagents, and can be used with chemical injection systems incorporating multiple injection points, atomizers, static mixers, downstream separators, wet scrubbers, drip feed systems, and vapor phase scrubbers for spent product separation and removal. They can also be used in bubble towers and absorption towers for maximum intimacy of liquid droplets with gas molecules.

Returning now again to FIG. 2, a supply pump 64 may be connected to the polymeric amine supply 60 to pump the polymeric amine reagent 62 from a storage container 66 to the second scrubbing solution circulator 50b. A line 68 illustratively extends between the storage container 66 and the second scrubber tank 42b to deliver the polymeric amine 62 to the second scrubbing solution 53b. The polymeric amine supply 60 is illustratively supplied to only the second scrubbing solution circulator 50b.

The hydrogen sulfide scrubber 40 further illustratively comprises a scrubbing solution charging line 70 for supplying a portion of the second scrubbing solution 53b to the first scrubbing solution 53a to charge the first scrubbing solution with the polymeric amine 62. The scrubbing solution charging line 70 is illustratively connected between the first scrubber tank 42a and second scrubber tank 42b. A charging line pump 72 is connected to the scrubber solution charging line 70 to pump a portion of the second scrubbing solution 53b from the sump 56b of the second scrubber tank 42b to the sump 56a of the first scrubber tank 42a. The pump 72 may not be needed in other embodiments, such as where the scrubbing solution is diverted from the pressure side of the circulating pump 58b, for example.

A make-up water supply 24a, 24b is illustratively connected to the each of the first and second scrubber tanks 42a, 42b to supply make-up water to the first and second scrubbing solutions 53a, 53b. When supplying the polymeric amine 62 to the second scrubber tank 42, make-up water may only be supplied to the second scrubber tank under normal operating conditions. The second make-up water supply 24b may supply make-up water at a desired rate depending on the size of the scrubber tanks 42a, 42b, e.g., 6 gallons per minute (gpm). Accordingly, the scrubbing solution charging line 70 may supply the first scrubbing solution 53a with a portion of the second scrubbing solution 53b at a substantially similar rate. Further, when supplying the polymeric amine 62 to the second scrubbing solution 53b, the make-up water supply 24a of the first scrubber tank 42a may be turned off at the first make-up water valve 25a, while the second make-up water valve 25b is set to 6 gpm, for example. The first and second scrubber tanks 42a, 42b may further illustratively include overflow lines 28a, 28b for maintaining the first and second scrubbing solutions 53a, 53b at desired levels within the sumps 56a, 56b.

Figure 3:
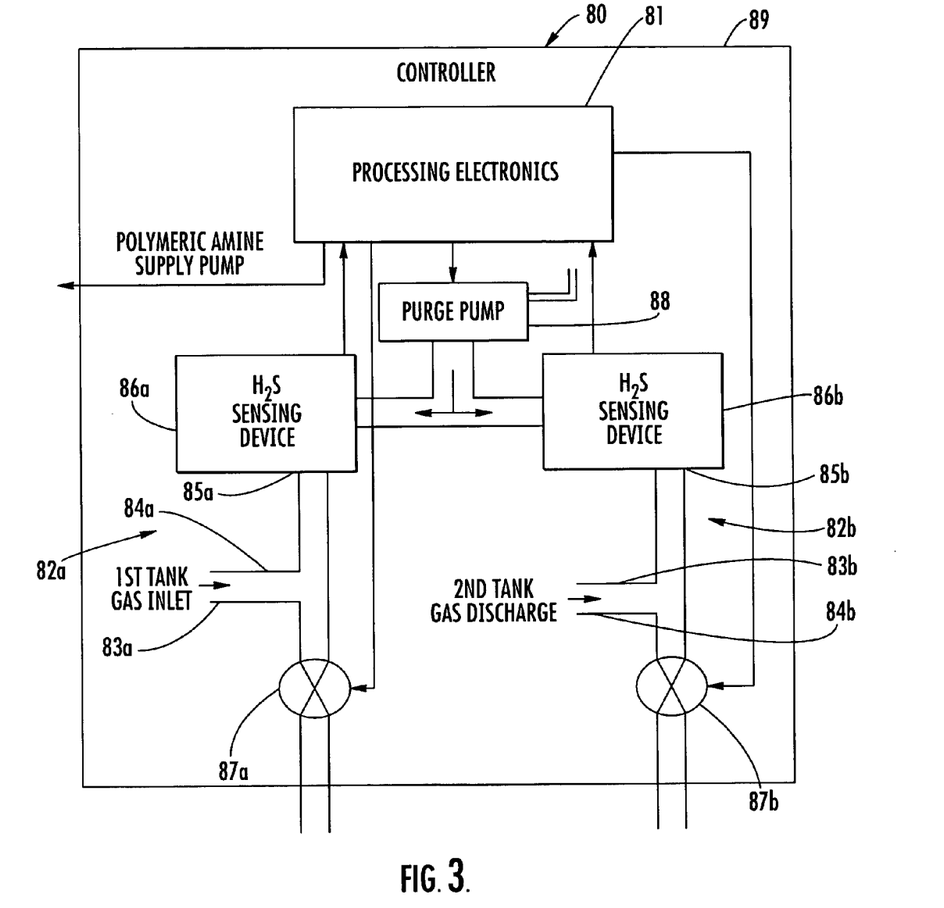
FIG. 3 is a more detailed schematic diagram of the controller and hydrogen sulfide sensors as shown in FIG. 2.

Turning now additionally to FIG. 3, a controller 80 for controlling the polymeric amine supply 60 is now described in more detail. The controller 80 is illustratively connected to the supply pump 64 to regulate the amount of polymeric amine 62 to be supplied to the second scrubbing solution 53b. The controller 80 illustratively includes a housing 89 containing processing electronics 81, such as mounted on a circuit board for example, for controlling the polymeric amine supply 60 as will be readily understood by those skilled in the art. Hydrogen sulfide sensors, including an inlet gas sensor 82a and a discharge gas sensor 82b, are connected to the processing electronics 81. Accordingly, the controller 80 controls the polymeric amine supply 60 based upon the inlet gas sensor 82a and discharge gas sensor 82b.

The inlet gas sensor 82a includes a sampling tube 83a having an inlet 84a that is illustratively connected in fluid communication with the hydrogen sulfide-containing gas flow 22 from the aerator 18 and into the inlet 43 of the first scrubber tank. The sampling tube 83a of the inlet gas sensor 82a also illustratively includes an outlet 85a. A hydrogen sulfide sensing device 86a is positioned remote from the aerator 18 illustratively within the controller housing 89, and is connected to the outlet 85a of the sampling tube 83a.

Similarly, the discharge gas sensor 82b includes a sampling tube 83b having an inlet 84b connected in fluid communication to the discharge gas flow 48 from the second scrubber tank 42b. The sampling tube 83b of the discharge gas sensor 82b also illustratively includes an outlet 85b. A hydrogen sulfide sensing device 86b is positioned remote from the second scrubber tank 42b and within the housing 89, and is connected to the outlet 85b of the sampling tube 83b.

A purge pump 88 is provided within the controller housing 89, and is illustratively connected to the processing electronics 81 and the sampling tubes 83a, 83b adjacent the outlets 85a, 85b. Condensation drain valves 87a, 87b are also illustratively connected to the processing electronics 81 and the sampling tubes 83a, 83b. The controller 80 periodically operates the purge pump 88 and the condensation drain valves 87a, 87b to drain condensation from within the sampling tubes 83a, 83b to thereby obtain more accurate hydrogen sulfide readings as will be appreciated by those skilled in the art.

Figure 4:
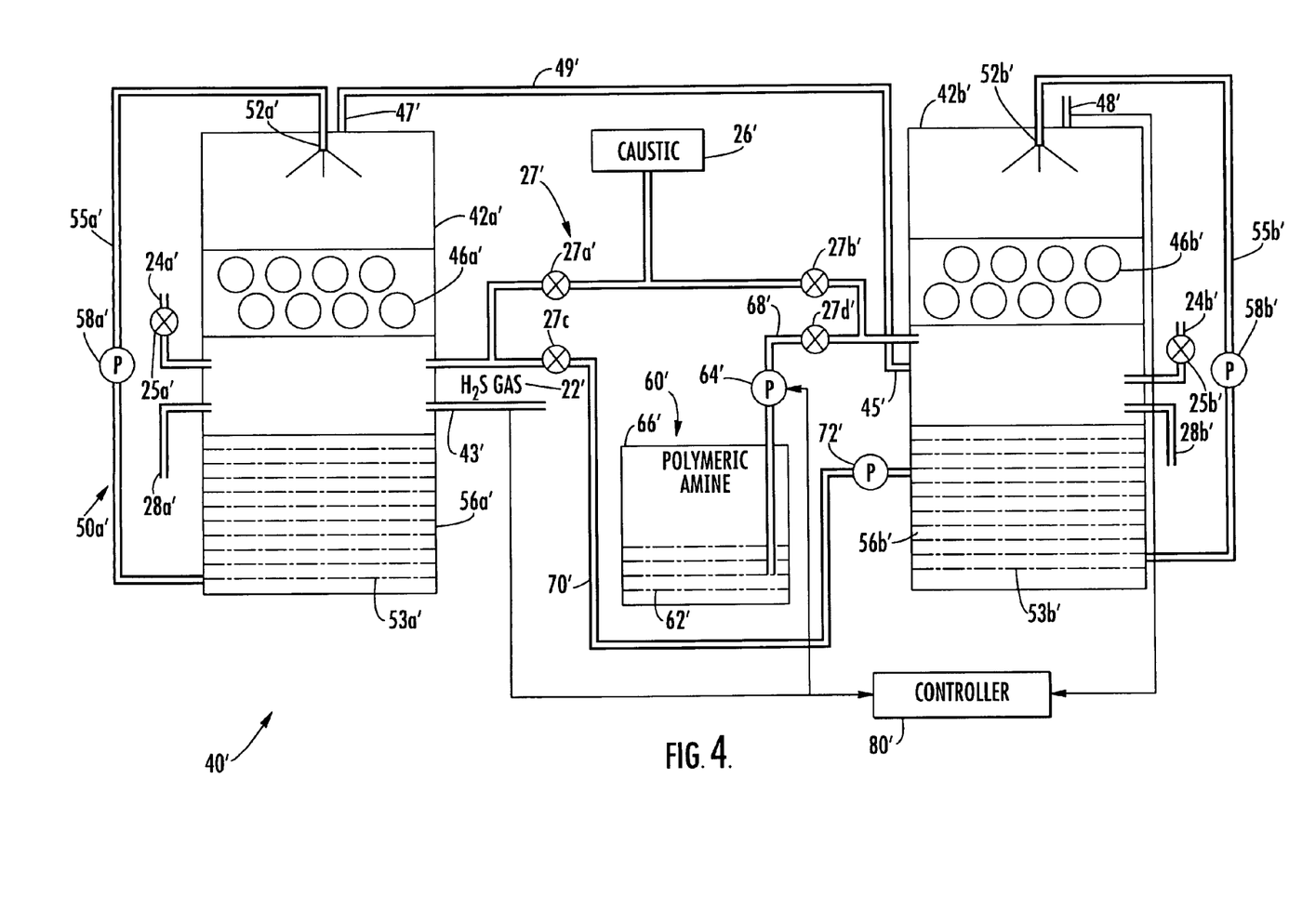
FIG. 4 is a schematic diagram of another embodiment of a hydrogen sulfide scrubber as shown in FIG. 2, but having both caustic and polymeric amine supplies.

Turning now more particularly to FIG. 4, a second embodiment of the hydrogen sulfide scrubber 40' is now described. In the second embodiment, the hydrogen sulfide scrubber 40' comprises a caustic supply 26' illustratively connected to the first and second scrubber tanks 42a', 42b'. A switchover valve arrangement 27' for permitting selective alternate operation using the caustic supply 26' or the polymeric amine compound supply 60' is illustratively included. More specifically, when use of the polymeric amine supply 60' is desired, valves adjacent the caustic supply 27a', 27b' are closed to cut off the supply of caustic material. A valve 27d' for the polymeric amine supply 60' is opened to allow the polymeric amine 62' to be supplied to the second scrubbing solution 53b'. Further, a valve on the charging line 27c' is opened to allow charging of the first scrubbing solution 53a' with a portion of the second scrubbing solution 53b'.

When using the caustic supply 26', make-up water is supplied to both the first and second scrubbing solution circulators 50a', 50b'. The opposite valve configuration is employed to again use the caustic. The other elements of the second embodiment of the hydrogen sulfide scrubber 40' are similar to those of the first embodiment, are identified using prime notation and require no further discussion herein. The retrofitting and switchover feature advantageously permits water treatment plant operators to become familiar and gain experience with the use of the polymeric amine 62 in the water treatment process before making a commitment to retire existing caustic based equipment.

Figure 5:
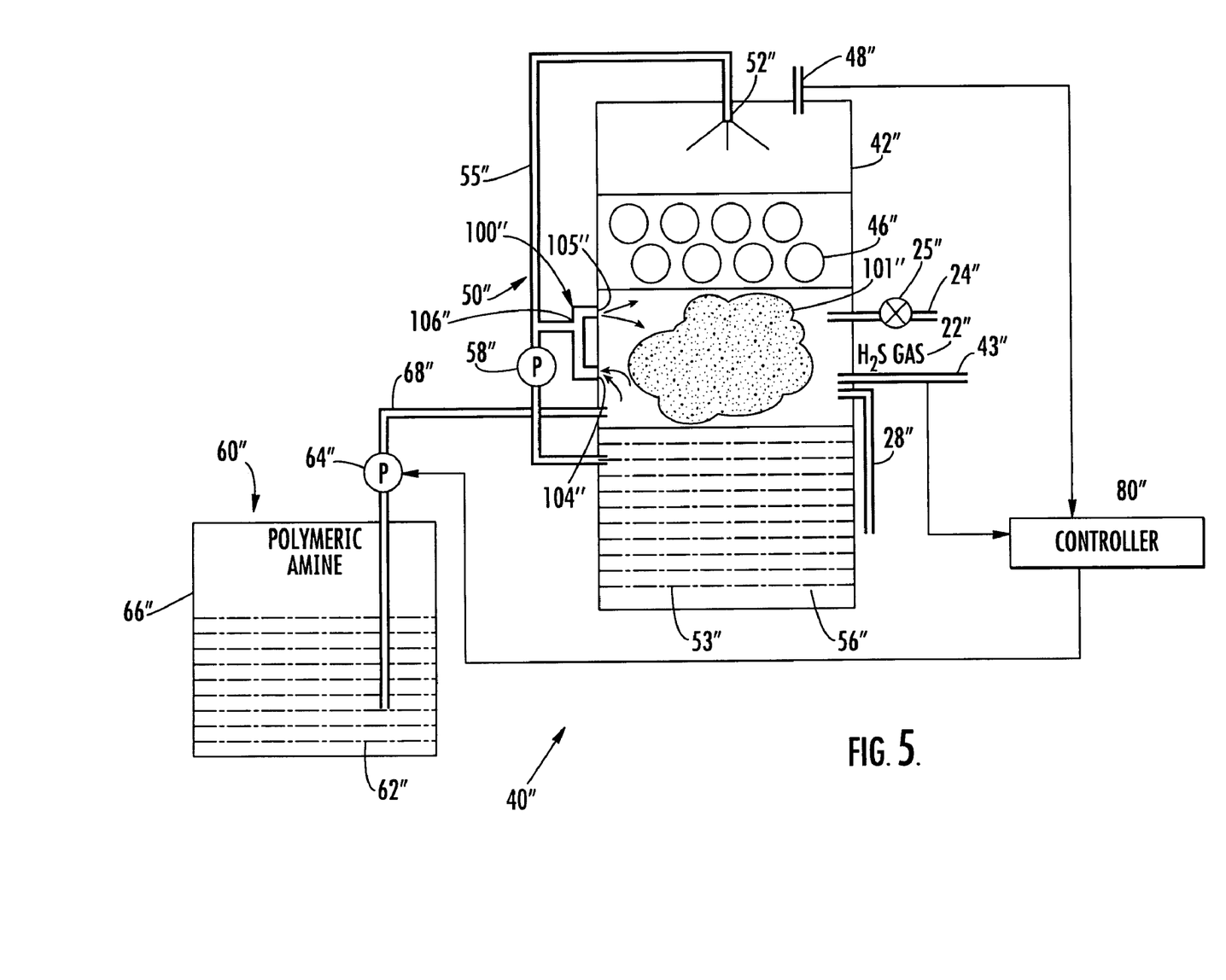
FIG. 5 is a schematic diagram of still another embodiment of the hydrogen sulfide scrubber according to the present invention.
Figure 6:
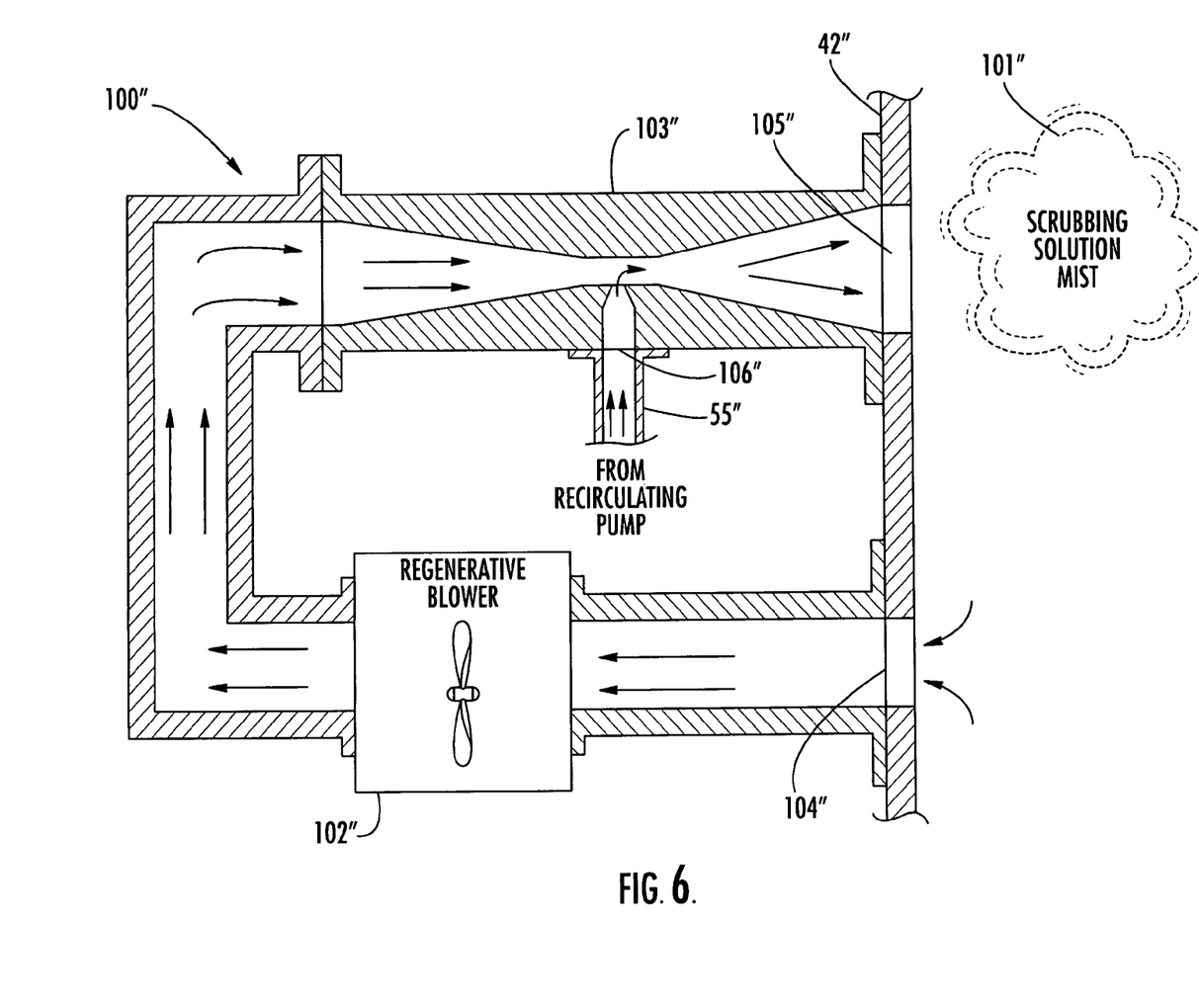
FIG. 6 is a more detailed schematic cross-sectional view of the regenerative blower and associated venturi injector nozzle as shown in FIG. 5.

Turning now additionally to FIGS. 5 and 6, a third embodiment of the hydrogen sulfide scrubber 40" and another advantageous features are now described. The third embodiment of the hydrogen sulfide scrubber 40" illustratively includes only a single scrubber tank 42". In accordance with this embodiment, a single stage of hydrogen sulfide reduction is provided using the polymeric amine supply 60", along with a mist generator 100" for generating a scrubber solution mist 101" in the space above the scrubbing solution 53" in the sump 56" and beneath the scrubber media 46".

The mist generator 100" includes a regenerative blower 102" and a nozzle associated therewith. The regenerative blower generates a flow from the inlet 104" to the outlet 105". In the illustrated embodiment, the nozzle is a venturi injection nozzle 103" having a liquid inlet 106" connected to the line 55" from the circulating pump 58". This nozzle 103" has found to be efficient in generating the desired scrubbing solution mist 101". The venturi injector nozzle 103" may of the type as provided by MAZZEI® Injector Corporation of Bakersfield, Calif. U.S. Pat. No. 5,863,128 also discloses such injectors, and the entire contents of this patent are incorporated herein by reference.

This scrubbing solution mist 101" is believed to further increase the contact time and area of the hydrogen sulfide-containing gas with the polymeric amine, and thereby greatly knock down the hydrogen sulfide and mercaptans. Accordingly, even for a multi-stage scrubber as described above, it may be sufficient to provide such a mist generator 100" including the regenerative blower 102" and associated venturi injector nozzle 103" on only the first or inlet stage. Of course, those of skill in the art will appreciate that this mist generator 100" may be used on additional or all other stages as well. The other elements of the third embodiment of the hydrogen sulfide scrubber 40" are similar to those of the first and second embodiments, are identified using double prime notation, and require no further discussion herein.

Figure 7:
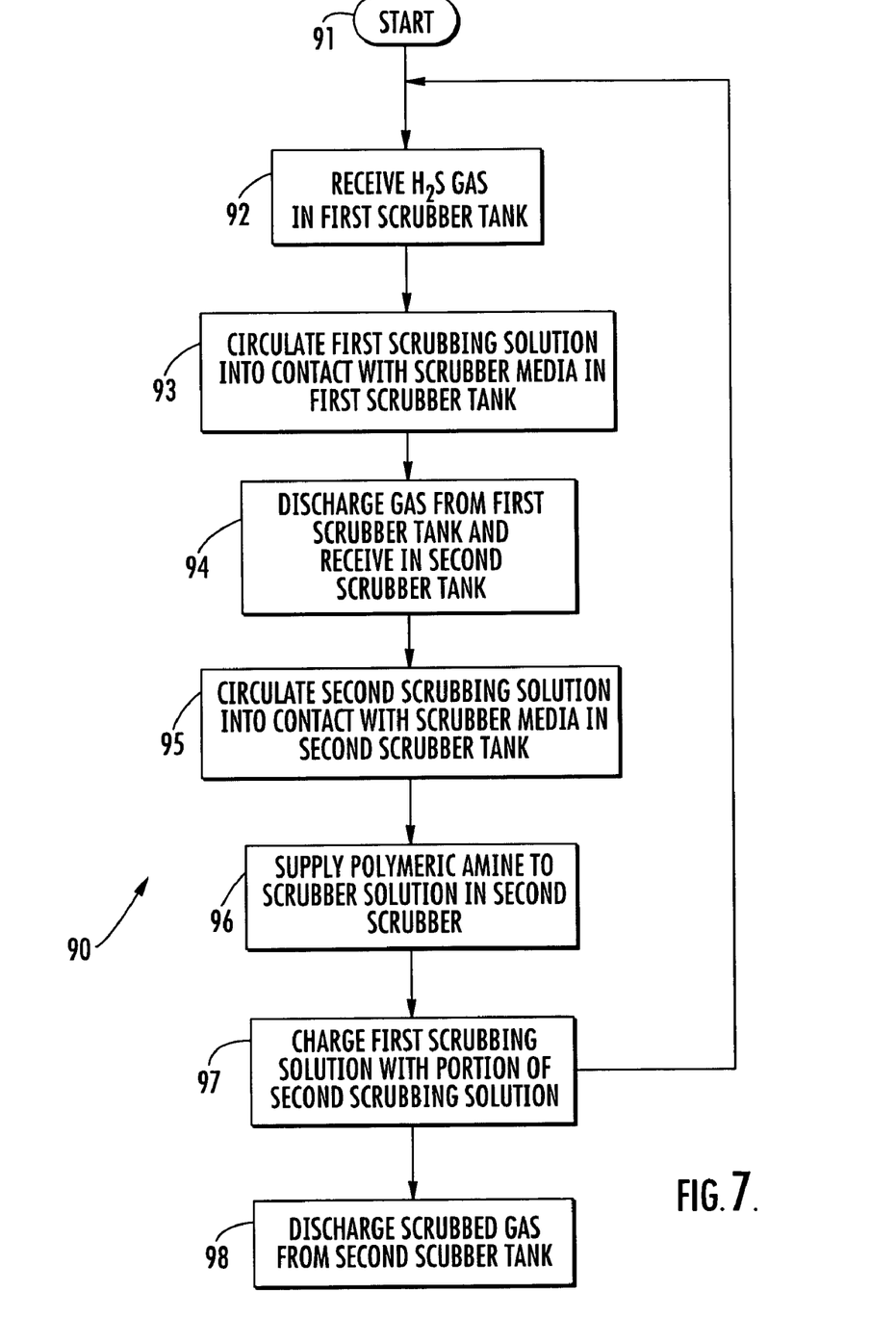
FIG. 7 is a flow chart illustrating a method of scrubbing hydrogen sulfide according to the present invention.

Turning now additionally to the flow chart 90 of FIG. 7, a method of scrubbing a hydrogen sulfide-containing gas flow 22 from an aerator 18 in a drinking water treatment system 10 is now described. From the start (Block 91), hydrogen sulfide-containing gas flow 22 is received in the first scrubber tank 42a at Block 92. At Block 93, the first scrubbing solution is circulated into contact with scrubber media 46a in the first scrubber tank 42a. At Block 94, gas is discharged from the first scrubbing tank 42a and received in the second scrubber tank 42b. The second scrubbing solution 53b is circulated into contact with scrubber media 46b in the second scrubber tank 42b at Block 95. At Block 96 the polymeric amine 62 is supplied to the second scrubber solution 53b. The first scrubber solution 53a is charged with a portion of the second scrubber solution 53b at Block 97. During this process, hydrogen sulfide-containing gas 22 is continuously received at Block 92. At Block 98, the scrubbed gas is discharged from the second scrubber tank 42b.

Figure 8:
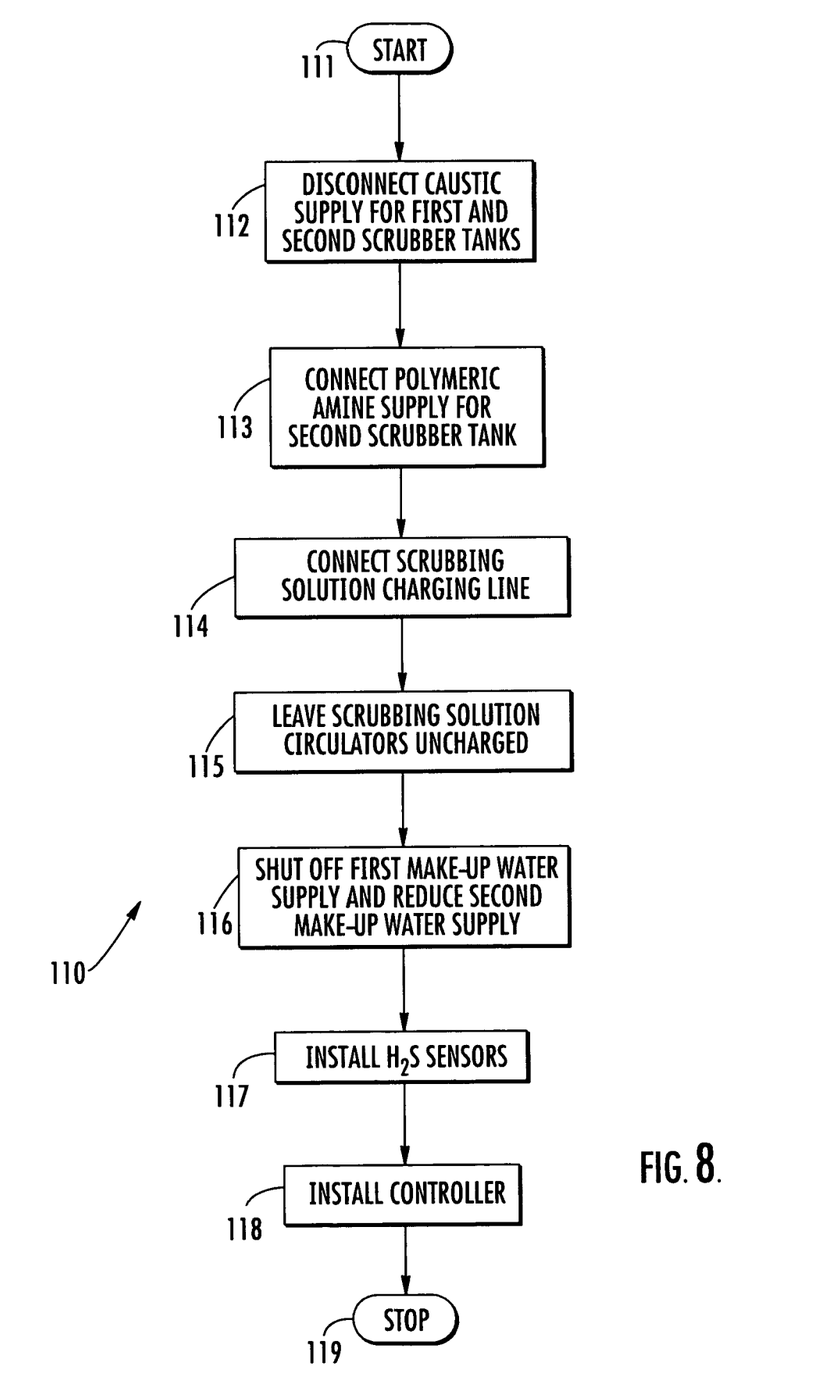
FIG. 8 is a flow chart illustrating a method of retrofitting a hydrogen sulfide scrubber according to the present invention.

Turning now additionally to the flow chart 110 of FIG. 8 and again to FIG. 4, a method of retrofitting the hydrogen sulfide scrubber 40 of the drinking water treatment system 10 from a caustic supply 26' to the polymeric amine supply 60' is now described. From the start (Block 111), the caustic supply 26' for the first and second scrubber tanks 42a', 42b' is disconnected or shut off by valve arrangement 27' at Block 112. At Block 113, the polymeric amine supply 60' is connected to the second tank 42b'. A scrubbing solution charging line 70 is connected between the second scrubber tank 42b and the first scrubber tank 42a' at Block 114. At Block 115 the scrubbing solution circulators 50a', 50b' are left unchanged. The make-up water supply 24a' of the first scrubber tank 42a' is turned off and the make-up water supply 24b' of the second scrubber tank 42b' is reduced at Block 116. At Block 117, the hydrogen sulfide sensors 82a', 82b' are installed and the controller 80' is installed at Block 118. The method is completed at Block 119.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

The invention claimed is:

1. A hydrogen sulfide scrubber comprising: a first scrubber tank and first scrubber media contained therein, said first scrubber tank having a gas flow inlet to receive a hydrogen sulfide-containing gas flow and a gas flow outlet;
a second scrubber tank and second scrubber media contained therein, said second scrubber tank having a gas flow inlet connected downstream from the gas flow outlet of said first scrubber tank;
a first scrubbing solution circulator comprising a first dispenser for dispensing a first scrubbing solution into contact with said first scrubber media, a first sump for collecting the first scrubbing solution after contact with said first scrubber media, and a first circulating pump for circulating the first scrubbing solution from said first sump back to said first dispenser after contact with said first scrubber media;
a second scrubbing solution circulator comprising a second dispenser for dispensing a second scrubbing solution into contact with said second scrubber media, a second sump for collecting the second scrubbing solution after contact with said second scrubber media, and a second circulating pump for circulating the second scrubbing solution from said second sump back to said second dispenser after contact with said second scrubber media;
a polymeric amine supply connected to said second scrubbing solution circulator; and
a scrubbing solution charging line for supplying a portion of the second scrubbing solution to the first scrubbing solution to charge the first scrubbing solution with the polymeric amine.

2. A hydrogen sulfide scrubber according to claim 1 further comprising a controller for controlling said polymeric amine supply.

3. A hydrogen sulfide scrubber according to claim 2 further comprising at least one hydrogen sulfide sensor connected to said controller; and wherein said controller controls said polymeric amine supply based upon said at least one hydrogen sulfide sensor.

4. A hydrogen sulfide scrubber according to claim 3 wherein said at least one hydrogen sulfide sensor comprises an inlet gas sensor including:
a first sampling tube having a first inlet connected in fluid communication with the hydrogen sulfide-containing gas flow to said first scrubber tank, and a first outlet;
a first hydrogen sulfide sensing device connected to the first outlet;
a first purge pump connected to said first sampling tube adjacent the first outlet; and
a first condensation drain valve connected to said first sampling tube.

5. A hydrogen sulfide scrubber according to claim 4 wherein said controller periodically operates said first purge pump and said first condensation drain valve.

6. A hydrogen sulfide scrubber according to claim 3 wherein said at least one hydrogen sulfide sensor comprises a discharge gas sensor including:
a second sampling tube having a second inlet connected in fluid communication with a discharge gas flow from said second scrubber tank, and a second outlet;
a second hydrogen sulfide sensing device connected to the second outlet;
a second purge pump connected to said second sampling tube adjacent the second outlet; and
a second condensation drain valve connected to said second sampling tube.

7. A hydrogen sulfide scrubber according to claim 6 wherein said controller periodically operates said second purge pump and said second condensation drain valve.

8. A hydrogen sulfide scrubber according to claim 1 further comprising a make-up water supply connected to at least one of said first and second scrubbing solution circulators.

9. A hydrogen sulfide scrubber according to claim 1 further comprising:
a caustic supply; and
a switchover valve arrangement for permitting selective alternate operation using said caustic supply or said polymeric amine supply.

10. A hydrogen sulfide scrubber according to claim 1 further comprising a regenerative blower and a nozzle connected thereto for generating a scrubbing solution mist in said first scrubber tank.

11. A hydrogen sulfide scrubber according to claim 10 wherein said first scrubber tank has a first space above said first sump and beneath said first scrubber media; and
wherein said regenerative blower and said nozzle generate the scrubbing solution mist in the first space.

12. A hydrogen sulfide scrubber according to claim 10 wherein said nozzle comprises a venturi injector nozzle.

13. A hydrogen sulfide scrubber comprising: a first scrubber tank and first scrubber media contained therein, said first scrubber tank having a gas flow inlet to receive a hydrogen sulfide-containing gas flow and a gas flow outlet;
a second scrubber tank and second scrubber media contained therein, said second scrubber tank having a gas flow inlet connected downstream from the gas flow outlet of said first scrubber tank;

a first scrubbing solution circulator comprising a first dispenser for dispensing a first scrubbing solution into contact with said first scrubber media, a first sump for collecting the first scrubber solution after contact with said first scrubber media, and a first circulating pump for circulating the first scrubbing solution from said first swap back to said first dispenser after contact with said first scrubber media;

a second scrubbing solution circulator comprising a second dispenser for dispensing a second scrubbing solution into contact with said second scrubber media, a second sump for collecting the second scrubbing solution after contact with said second scrubber media, and a second circulating pump for circulating the second scrubbing solution from said second sump back to said second dispenser after contact with said second scrubber media;

a polymeric amine supply connected to at least one of said first and second scrubbing solution circulators; and a regenerative blower and a nozzle connected thereto for generating a scrubbing solution mist in at least one of said first and second scrubber tanks.

14. A hydrogen sulfide scrubber according to claim 13 wherein said first scrubber tank has a first space above said first sump and beneath said first scrubber media; and wherein said regenerative blower and said nozzle generate the scrubbing solution mist in the first space.

15. A hydrogen sulfide scrubber according to claim 13 wherein said nozzle comprises a venturi injector nozzle.

16. A hydrogen sulfide scrubber according to claim 15 further comprising a controller for controlling said polymeric amine supply.

17. A hydrogen sulfide scrubber according to claim 16 further comprising at least one hydrogen sulfide sensor connected to said controller; and wherein said controller controls said polymeric amine supply based upon said at least one hydrogen sulfide sensor.

18. A hydrogen sulfide scrubber according to claim 17 wherein said at least one hydrogen sulfide sensor comprises an inlet gas sensor including:
a first sampling tube having a first inlet connected in fluid communication with the hydrogen sulfide-containing gas flow to said first scrubber tank, and a first outlet;
a first hydrogen sulfide sensing device connected to the first outlet;
a first purge pump connected to said first sampling tube adjacent the first outlet; and
a first condensation drain valve connected to said first sampling tube.

19. A hydrogen sulfide scrubber according to claim 18 wherein said controller periodically operates said first purge pump and said first condensation drain valve.

20. A hydrogen sulfide scrubber according to claim 17 wherein said at least one hydrogen sulfide sensor comprises a discharge gas sensor including:
a second sampling tube having a second inlet connected in fluid communication with a discharge gas flow from said second scrubber tank, and a second outlet;
a second hydrogen sulfide sensing device connected to the second outlet;
a second purge pump connected to said second sampling tube adjacent the second outlet; and
a second condensation drain valve connected to said second sampling tube.

21. A hydrogen sulfide scrubber according to claim 20 wherein said controller periodically operates said second purge pump and said second condensation drain valve.

22. A hydrogen sulfide scrubber according to claim 13 further comprising a make-up water supply connected to at least one of said first and second scrubbing solution circulators.

23. A hydrogen sulfide scrubber according to claim 13 further comprising:
a caustic supply; and
a switchover valve arrangement for permitting selective alternate operation using said caustic supply or said polymeric amine supply.

24. A hydrogen sulfide scrubber comprising: a scrubber tank and scrubber media contained therein;
a scrubbing solution circulator comprising a dispenser for dispensing a scrubbing solution into contact with said scrubber media, a sump for collecting the scrubbing solution after contact with said scrubber media, and a circulating pump for circulating the scrubbing solution from said sump back to said dispenser after contact with said scrubber media;
a polymeric amine supply connected to said scrubbing solution circulator; and
a regenerative blower and a nozzle connected thereto for generating a scrubbing solution mist in said scrubber tank.

25. A hydrogen sulfide scrubber according to claim 24 wherein said scrubber tank has a space above said sump and beneath said scrubber media; and wherein said regenerative blower and said nozzle generate the scrubbing solution mist in the space.

26. A hydrogen sulfide scrubber according to claim 24 wherein said nozzle comprises a venturi injector nozzle.

27. A hydrogen sulfide scrubber according to claim 24 further comprising a controller for controlling said polymeric amine supply.

28. A hydrogen sulfide scrubber according to claim 27 further comprising at least one hydrogen sulfide sensor connected to said controller; and wherein said controller controls said polymeric amine supply based upon said at least one hydrogen sulfide sensor.

29. A hydrogen sulfide scrubber according to claim 24 further comprising a make-up water supply connected to said scrubbing solution circulator.

30. A method for hydrogen sulfide scrubbing comprising:
using a first scrubber tank and first scrubber media contained therein by operating a first scrubbing solution circulator comprising a first dispenser dispensing a first scrubbing solution into contact with the first scrubber media, a first sump collecting the first scrubbing solution after contact with the first scrubber media, and a first circulating pump circulating the first scrubbing solution from the first sump back to the first dispenser after contact with the first scrubber media;
using a second scrubber tank and second scrubber media contained therein downstream from the first scrubber tank by operating a second scrubbing solution circulator comprising a second dispenser dispensing a second scrubbing solution into contact with the second scrubber media, a second sump collecting the second scrubbing solution after contact with the second scrubber media, and a second circulating pump circulating the second scrubbing solution from the second sump back to the second dispenser after contact with the second scrubber media;
supplying a polymeric amine to the second scrubbing solution circulator; and supplying a portion of the second scrubbing solution to the first scrubbing solution via a charging line to charge the first scrubbing solution with the polymeric amine.

31. A method according to claim 30 further comprising controlling supplying the polymeric amine using a controller.

32. A method according to claim 31 further comprising controlling based upon at least one hydrogen sulfide sensor.

33. A method according to claim 32 wherein the at least one hydrogen sulfide sensor comprises an inlet gas sensor.

34. A method according to claim 32 wherein the at least one hydrogen sulfide sensor comprises an outlet gas sensor.

35. A method according to claim 30 further comprising adding makeup water to at least one of the first and second scrubbing solutions.

36. A method according to claim 30 further comprising permitting selective alternate operation using a caustic or the polymeric amine.

37. A method according to claim 30 further comprising generating a scrubbing solution mist in at least one of the first and second scrubber tanks using a regenerative blower and a nozzle connected thereto.

38. A method according to claim 37 wherein the first scrubber tank has a first space above the first sump and beneath the first scrubber media; and wherein the scrubbing solution mist is generated in the first space.

39. A method for hydrogen sulfide scrubbing comprising:
using a scrubber tank and scrubber media contained therein by operating a scrubbing solution circulator comprising a dispenser dispensing a scrubbing solution into contact with the scrubber media, a sump collecting the scrubbing solution after contact with the scrubber media, and a circulating pump circulating the scrubbing solution from the sump back to the dispenser after contact with the scrubber media;
supplying a polymeric amine to the scrubbing solution circulator; and
generating a scrubbing solution mist in the scrubber tank using a regenerative blower and a nozzle connected thereto.

40. A method according to claim 39 wherein the scrubber tank has a first space above the sump and beneath the scrubber media; and wherein the scrubbing solution mist is generated in the space.

41. A method according to claim 39 wherein the nozzle comprises a venturi injector nozzle.

42. A method according to claim 39 further comprising controlling supplying the polymeric amine using a controller.

43. A method according to claim 42 further comprising controlling based upon at least one hydrogen sulfide sensor.

44. A method according to claim 43 wherein the at least one hydrogen sulfide sensor comprises an inlet gas sensor.

45. A method according to claim 43 wherein the at least one hydrogen sulfide sensor comprises an outlet gas sensor.

46. A method according to claim 39 further comprising adding make-up water to the scrubbing solution.

47. A method according to claim 39 further comprising permitting selective alternate operation using a caustic or the polymeric amine supply.

* * * * *